United States Patent [19]

Yamada et al.

[11] 4,068,040

[45] Jan. 10, 1978

[54] MAGNETIC RECORDING MEMBERS

[75] Inventors: Yasuyuki Yamada; Kazuhiko Morita; Goro Akashi, all of Odawara, Japan

[73] Assignee: Fuji Photo Film Co., Ltd., Minami-ashigara, Japan

[21] Appl. No.: 588,936

[22] Filed: June 20, 1975

Related U.S. Application Data

[63] Continuation of Ser. No. 282,093, Aug. 21, 1972, abandoned.

[30] Foreign Application Priority Data

Aug. 21, 1971  Japan ............................ 46-63927

[51] Int. Cl.$^2$ ............................................. H01F 10/02
[52] U.S. Cl. ............................ 428/425; 427/128; 428/500; 428/900
[58] Field of Search .................... 427/127–132, 427/48; 428/900, 500, 425; 252/62.54

[56]  References Cited

U.S. PATENT DOCUMENTS

| | | | |
|---|---|---|---|
| 2,978,414 | 4/1961 | Harz et al. | 427/128 UX |
| 3,216,846 | 11/1965 | Hendricx et al. | 427/128 UX |
| 3,274,111 | 9/1966 | Sada et al. | 427/128 UX |
| 3,357,855 | 12/1967 | Bisschops et al. | 427/128 UX |
| 3,366,505 | 1/1966 | Bisschops et al. | 427/128 UX |
| 3,387,993 | 6/1968 | Flowers | 427/128 UX |
| 3,510,489 | 5/1970 | Graham et al. | 427/128 UX |
| 3,597,273 | 8/1971 | Akashi et al. | 427/128 UX |
| 3,630,771 | 12/1971 | Akashi et al. | 427/128 UX |
| 3,650,828 | 3/1972 | Higashi et al. | 427/128 UX |
| 3,690,946 | 9/1972 | Hartmann et al. | 427/128 UX |
| 3,733,293 | 5/1973 | Gallagher et al. | 427/128 UX |

*Primary Examiner*—Bernard D. Pianalto
*Attorney, Agent, or Firm*—Sughrue, Rothwell, Mion, Zinn and Macpeak

[57]  ABSTRACT

Magnetic recording tapes having an excellent durability are obtained by using as a binder for ferromagnetic powders on a base film or sheet an intimate mixture of (1) a vinyl chloride-vinyl acetate copolymer, (2) an organic polyisocyanate and (3) a reactive acrylic resin having a carboxyl group content of from 1 to 30% by weight which will react through the carboxyl groups with the polyisocyanate compound into a crosslinked cured state.

5 Claims, 1 Drawing Figure

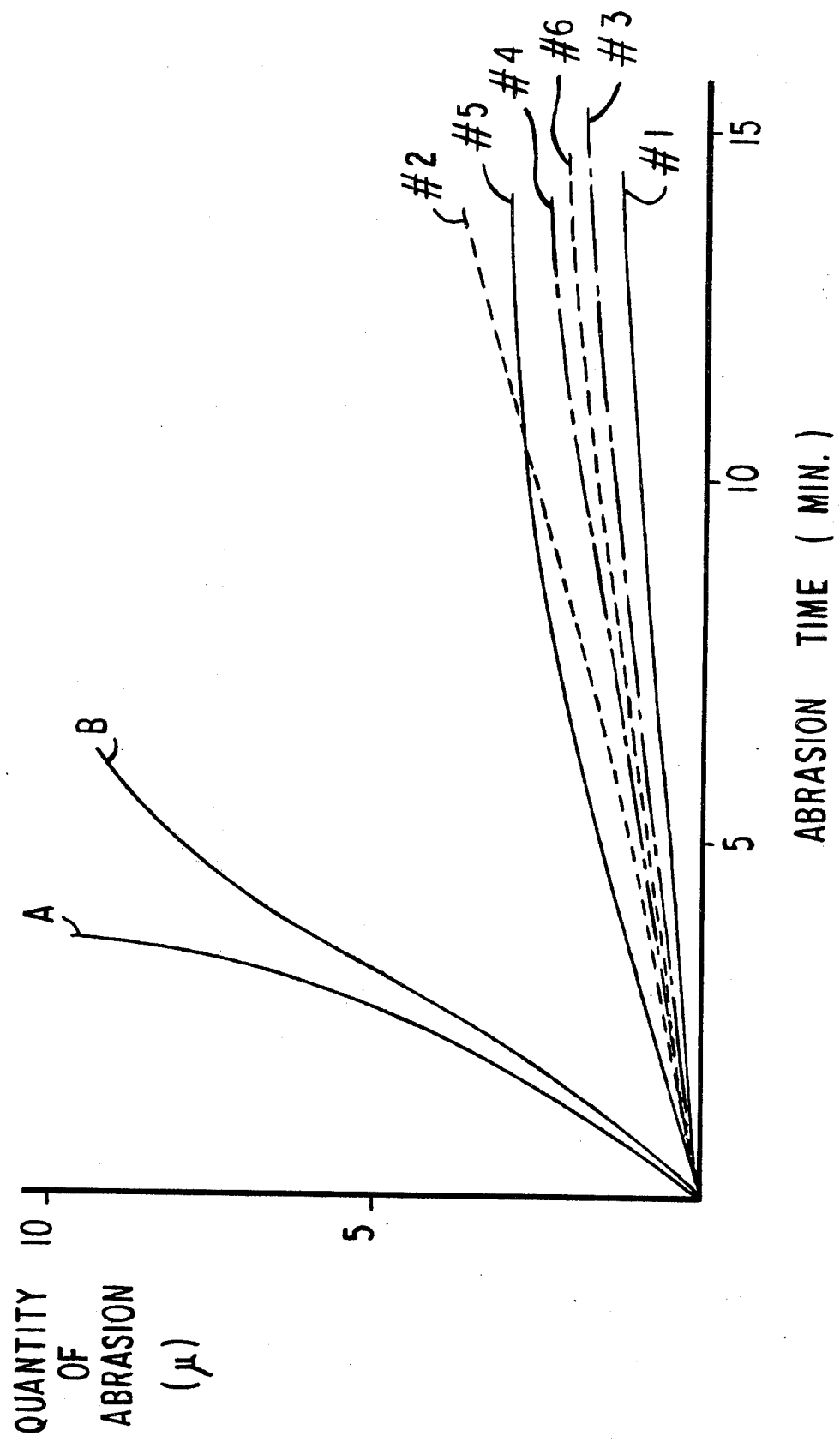

MAGNETIC RECORDING MEMBERS

This is a continuation of application Ser. No. 282,093, filed Aug. 21, 1972, now abandoned.

BACKGROUND OF THE INVENTION

1. Field of the Invention

This invention relates to magnetic recording members and, more particularly, to a binder which has an excellent abrasion resistance and which is suitably used in, especially, video tapes and magnetic recording members for electronic computers.

2. Description of the Prior Art

In conventional magnetic recording members comprising ferromagnetic powders in a binder on a base film or sheet formed of, e.g., poly(ethylene terephthalate), diacetyl cellulose, triacetylcellulose or polyvinyl chloride, binders such as vinyl chloride-vinyl acetate copolymers, poly(butyl acrylate), nitrocellulose, cellulose propionate, cellulose acetate butyrate, ethylcellulose, polyvinyl acetate, styrene-butadiene copolymers, vinyl fluoride resins, post-chlorinated polyvinyl chloride, chlorinated polypropylene, polyvinyl butyral, acrylate ester copolymers, vinyl acetate-ethylene copolymers, phenolic resins, melamine resins, urea resins, epoxy resins, polyamide resins, alkyd resins, silicone resin and the like, and derivatives thereof have been used. Magnetic recording tapes, especially video tapes and magnetic recording tapes for electronic computers, prepared by using such a conventional binder as described above often cause significant machine difficulties, i.e., drop-out due to abrasion of the magnetic layer.

SUMMARY OF THE INVENTION

A binder which does not at all possess the disadvantages of the conventional binder now has been found; and the binder provides a magnetic layer having excellent abrasion resistance and good surface characteristics. The binder is obtained by blending a vinyl chloride-vinyl acetate copolymer with a reactive acrylic or methacrylic resin. As the result of investigations, it has been discovered that vinyl chloride-vinyl acetate copolymers are inferior in abrasion resistance and are abraded remarkably when used as a binder for magnetic powders, through contact with a magnetic recording head, but a binder prepared by incorporating an organic polyisocyanate compound and a reactive acrylic or methacrylic resin which is curable through reaction with the polyisocyanate compound into the vinyl chloride-vinyl acetate copolymer results in a magnetic layer having a very smooth surface and which is markedly superior in abrasion resistance to conventional binders.

Namely, the present invention comprises a magnetic recording member of the type having a coating layer of a dispersion of magnetic powders in a binder on a support in which the binder contains a vinyl chloride-vinyl acetate copolymer, an organic polyisocyanate compound and a reactive acrylic resin which is curable through reaction with the organic polyisocyanate compound.

BRIEF DESCRIPTION OF THE ACCOMPANYING DRAWING

The FIGURE shows the abrasion resistance of magnetic tapes using the binder of the invention (curves 1 to 6) in comparison with magnetic tapes using a conventional binder (curves A and B).

DETAILED DESCRIPTION OF THE INVENTION

The reactive acrylic resin which can be used in the magnetic recording member of the present invention includes copolymers (having a degree of polymerization of from 600 to 3000, preferably from 800 to 1800) of a major proportion of an ester of acrylic or methacrylic acid with one or more comonomers, such as methyl, ethyl and butyl alcohols, containing from 1 to 30% by weight of carboxyl groups as the group through which the acrylic or methacrylic copolymers react with the polyisocyanate compound. Comonomers having carboxyl groups include, e.g., acrylic acid, methacrylic acid and itaconic acid.

The magnetic powders which can be used in the practice of the present invention include, in addition to those as used in the examples as set forth hereinafter, Fe—Co—Ni alloy powders and the like.

Vinyl chloride-vinyl acetate copolymers have the advantages that particles of magnetic powders and other inorganic pigments can be easily dispersed therein and a firmly bonded magnetic layer on a support is formed, but it is unsatisfactory to use the copolymers by themselves as a binder for making abrasion resistant magnetic recording tapes because of their poor thermal resistance due to their low softening point. This problem is, however, resolved by use of the copolymer in combination with a reactive acrylic resin as described above.

As the organic polyisocyanate compound which can be suitably used are aromatic and aliphatic diisocyanates, such as, e.g., toluene diisocyanate, diphenylmethane diisocyanate, methylene-p-phenyl diisocyanate, 4,4'-diphenyl diisocyanate, hexamethylene diisocyanate, p-phenylene diisocyanate, 4-methyl-m-phenylene diisocyanate, and adducts of a diisocyanate with a polyol, such as adduct of hexamethylene diisocyanate with trimethylolpropane.

The binder preferably is used in a proportion of from 150 to 70 parts by weight per 300 parts by weight of a magnetic powder. When the binder is used in a too large a proportion, the magnetic recording tape obtained will have a Bm/d value (Bm value per unit thickness of the magnetic layer) which is too low for practical use. On the other hand, use of the binder in a too small a proportion causes scale-off of the magnetic layer. Therefore, the suitable proportion of the binder ranges between 150 parts and 70 parts by weight.

The weight ratio of the vinyl chloride-vinyl acetate copolymer to the reactive acrylic or methacrylic resin can be varied within the range of from 70:30 to 15:85. The use of the vinyl chloride-vinyl acetate copolymer in excess proportions results in a poor durability of the resulting tape, and in insufficient proportions makes it difficult to uniformly disperse the magnetic particles in the binder.

The organic polyisocyanate is incorporated in order to crosslink the reactive acrylic resin and, therefore its proportion is varied depending on the required physical properties of tape, especially the stiffness of tape required. In general, the polyisocyanate can be used in amounts of from 10 to 40% by weight of the reactive acrylic resin. Of course, the larger the amount of the polyisocyanate used, the higher the stiffness of the tape obtained. Variation of the amount of polyisocyanate within the above range causes no substantial change in the durability of the tape. If the amount is too small, the tape obtained is too poor in durability, while if the amount is too large the tape obtained will have defects such as incomplete contact of the tape with the recording head due to its too high stiffness.

The weight ratio of vinyl chloride and vinyl acetate in the copolymer can range from 70:30 to 98:2, preferably from 85:15 to 95:5.

It is essential for the binder of the present invention to contain, as its ingredients, a vinyl chloride-vinyl acetate copolymer, an organic polyisocyanate compound and a reactive acrylic resin capable of being cured by reaction with the polyisocyanate compound and, of course, up to 80% by weight of the vinyl chloride-vinyl acetate copolymer may be substituted, as illustrated in the following Example 3, by a vinylidene chloride copolymer, acrylonitrile copolymer or a like thermoplastic resin so as to change the physical properties, especially stiffness, of the tape as desired.

Embodiments of the present invention will hereinafter be illustrated in greater detail by reference to the following examples.

EXAMPLE 1

A mixture of the following composition was worked up in a ball mill to form a dispersion.

| | (parts by weight) |
|---|---|
| $\gamma$-Fe$_2$O$_3$ Powder | 300 |
| VYHH (vinyl chloride-vinyl acetate (VCl-Vac copolymer, supplied by the Union Carbide Corp.) VCl/VAC weight ratio is 87/13. | 30 |
| Electroconductive Carbon Black | 20 |
| Silicone Oil ("Shinetsu-Silicone KF-96" Trade Name, produced by Shinetsu Silicone Co., Ltd.) | 0.2 |
| Lecithin | 3 |
| Butyl Acetate | 500 |

The mixture was then added with a liquid mixture of 60 parts by weight of a reactive acrylic resin (degree of polymerization of about 1,000) containing butyl acrylate and acrylonitrile in a weight ratio of 8:2 and acrylic acid in the amount so as to provide a carboxylic group content of 1.2% by weight, 9 parts by weight of a polyisocyanate and 150 parts by weight of butyl acetate to a ball mill, worked up in the ball mill until a uniform dispersion was obtained, filtered and applied to a subbed 25$\mu$ thick poly(ethylene terephthalate) base so as to form thereon a dry coating film of a thickness of 12$\mu$. The coating film thus obtained was aged at room temperature to complete the reaction between the acrylic resin and the polyisocyanate. After 48 hours, the surface of the coated film was worked up using a hot super calender to obtain Sample No. 1.

EXAMPLE 2

The following mixture was worked up in a ball mill to form a suspension.

| | (parts by weight) |
|---|---|
| Fe$_3$O$_4$ Powder | 300 |
| 400 $\times$ 110A (Trade Name, a COOH— containing VCl-Vac resin produced by Japan Zeon Co.) VCl/VAC weight ratio is 86/13. | 20 |
| Electroconductive Carbon Black | 20 |
| Silicone Oil | 0.2 |
| Lecithin | 3 |
| Fluorocarbon Oil | 3 |
| Methyl Isobutyl Ketone | 500 |

The suspension was then added with a liquid mixture of 70 parts by weight of a reactive acrylic resin having a degree of polymerization of 1,300 obtained by terpolymerization of ethyl methacrylate and acrylonitrile in a weight ratio of 7.8:2.2 and, in addition, acrylic acid in an amount so as to provide a carboxyl group content in the terpolymer of 8% by weight, 8.6 parts by weight of a polyisocyanate ["Koronate HL" (Trade Name, polyisocyanate produced by Nippon Polyurethane Industry Co., Ltd.)] and 160 parts by weight of methyl isobutyl ketone and the mixture was processed using the same procedure as described in Example 1 to form a magnetic recording tape (Sample No. 2).

EXAMPLE 3

The same procedure as described in Example 1 was repeated except that a ferromagnetic powder containing 5% by weight of cobalt was used in place of the ferromagnetic powder in Example 1 and 50% by weight of the VYHH was replaced by a copolymer of butyl acrylate (80 mol %) and vinylidene chloride (20 mol %) copolymer to form a Sample No. 3.

EXAMPLE 4

The same procedure as described in Example 2 was repeated except that CrO$_2$ was used in place of Fe$_3$O$_4$, Vinylite VAGH [Trade Name, copolymer of vinylchloride (91 wt %), vinylacetate (3 wt %) and other component (The residue), produced by Union Carbide Corporation, U.S. A.] was used in place of 400 $\times$ 110A and as the reactive acrylic resin a terpolymer of ethyl acrylate and acrylonitrile (having a degree of polymerization of about 1800) in a weight ratio of 7:3 and itaconic acid in an amount so as to provide a carboxyl group content of 13% by weight of the terpolymer was used to form Sample No. 4.

EXAMPLE 5

The same procedure as described in Example 1 was repeated except that a reactive acrylic resin having a carboxyl group content of 28% by weight was used to form Sample No. 5.

EXAMPLE 6

The following mixture was worked up in a ball mill to form a dispersion.

| | (parts by weight) |
|---|---|
| $\gamma$-Fe$_2$O$_3$ | 300 |
| Vinylite-VYNS (Trade Name, copolymer of vinylchloride (90 wt %) and vinyl acetate (10 wt %), produced by Union Carbide Corporation, U.S.A.) | 35 |
| Graphite Dust | 30 |
| Silicone Oil | 0.2 |
| Lecithin | 3 |
| Methyl Isobutyl Ketone/Toluene (3:2 mixture weight ratio) | 500 |

The dispersion was then added with a liquid mixture of 70 parts by weight ARON S 2003 (Trade Name, the product of Toagosei Chemical Industry Co., Ltd. The degree of polymerization is about 1200) a reactive acrylic resin which was determined by analysis to have a carboxyl group content of 2.7% by weight, 13 parts by weight of a polyisocyanate and 180 parts by weight of methyl isobutyl ketone/toluene (2:3 by weight mixture) to a ball mill, filtered and applied to a 22μ thick poly(ethylene terephthalate) base to form thereon a coating film of a dry thickness of 12μ. The coating film was aged at room temperature to complete curing and then worked up in the same manner as described in Example 1 to form a Sample No. 6.

It had been formerly discovered that a binder composition containing a cellulose derivative, an organic polyisocyanate compound and a reactive acrylic resin which is curable through reaction with the polyisocyanate compound gives a coating film having excellent surface smoothness and abrasion resistance. It has now been found out that the binder composition of the present invention is excellent in adhesion to the support in comparison with the prior cellulose derivative based binder composition, and is completely free from the phenomonon of magnetic layer scale off from the edges of a running magnetic recording tape which causes drop-out. Thus, it has been ascertained that the thickness of a subbing layer for the binder composition of the present invention is ½ to ⅓ times that of a subbing layer necessary for the above cellulose derivatives based binder composition. Illustrating this in greater detail, the cellulose derivative based binder composition gives a relatively hard coating film and, consequently, a moderately rigid magnetic layer and when a wide tape is slit into a number of magnetic recording tapes this rigidity results in cracks in the slit edges of the magnetic recording tape, the cracks being latent breakages. It is believed that this latent breakage is manifested during high speed running of the tape as coarse cracks and, finally, scale-off of the magnetic layer at the split edges to cause drop-out. A sufficient thickness of a subbing layer is applied to a support for the cellulose derivative based binder to prevent the drop-out due to the scale-off.

It has been proven that a subbing layer of a thickness of ½ to ⅓ times that of the conventional subbing layer is sufficient for the binder composition of the present invention because the magnetic layer formed using the binder composition of the present invention is pliable and resilient and, consequently compliant to the flexure of the support and excellent in adhesion to the support.

COMPARATIVE EXAMPLE A

A magnetic recording tape (Sample A) was prepared by applying to a support a coating liquid of the following composition.

|  | (parts by weight) |
|---|---|
| γ-Fe₂O₃ | 300 |
| Nitrocellulose "RS½" (Trade Name, produced by Asahi Chemical Industries Co., Japan) | 70 |
| Polybutylacrylate (plasticizer, ethylacetate solution, solid content 40%, 1500 cps at 20° C) | 20 |
| Lecithin | 8 |
| "Chemistat 2009 A" (anionic surface active agent) (Trade Name, produced by Sanyo Chemical Industries Co., Japan) | 10 |
| Trifluorochloroethylene Polymer | 5 |

-continued

|  | (parts by weight) |
|---|---|
| (in oily state) | |
| Butyl Acetate | 450 |
| Toluene | 150 |

COMPARATIVE EXAMPLE B

A tape Sample B was prepared using VYHH, a vinyl chloride-vinyl acetate copolymer, in place of the nitrocellulose "RS ½" in the composition of the above Comparative Example A.

In the accompanying drawing, the FIGURE is a graph indicating the abrasion resistance of the magnetic recording tapes prepared in the above Examples 1 to 6 and Comparative Examples A and B. The numbers on the abscissa indicate the abrasion time in minutes and the numbers on the ordinate indicate the quantity of abrasion in μ. The mark on each curve in the graph is the sample number corresponding to the above Examples 1 to 6 and Comparative Examples A and B.

As is evident from the FIGURE, it takes 10 to 20 minutes or more time to abrade the magnetic recording tapes in accordance with the present invention for the quantity that the conventional magnetic recording tapes prepared in the above Comparative Examples A and B are abraded within 1 to 2 minutes. Namely, in accordance with the present invention, the smoothness and abrasion resistance of the magnetic layer of a magnetic recording tape are improved to values of at least 10 times that of the magnetic layer of the conventional one. This number, of course, indicates the ratio of durable time of the magnetic recording tape of the present invention to that of the conventional one and, from this fact, it can be easily seen that the advantage brought about by the present invention is of a great importance from a practical point of view.

Thus, the magnetic recording tape of the present invention has a strong point in its abrasion resistance which is unattainable in any way by use of the conventional binders.

In the practice of the present invention, any of the known or commercially available products can be employed as the ingredients for the magnetic layer and the material of the support for example, polyethylene terephthalate, diacetylcellulose, triacetylcellulose, polyvinyl chloride and the like can be used.

While the invention has been described in detail and with reference to specific embodiments thereof, it will be apparent to one skilled in the art that various changes and modifications can be made therein without departing from the spirit and scope thereof.

What is claimed is:

1. A magnetic recording member comprising a support and a coating of a dispersion of a ferromagnetic powder in a binder comprising (1) a copolymer consisting essentially of a vinyl chloride-vinyl acetate copolymer wherein the weight ratio of vinyl chloride to vinyl acetate in the copolymer ranges from 70:30 to 98:2, (2) an organic polyisocyanate compound and (3) a reactive acrylic resin, said resin having a carboxyl group content of from 1 to 30% by weight which is cured through reaction with said organic polyisocyanate compound; and wherein said binder comprises said vinyl chloride-vinyl acetate copolymer in a weight ratio to said reactive acrylic resin of 70:30 to 15:85 and said polyisocyanate in an amount from 10 to 40% by weight based on the reactive acrylic.

2. The magnetic recording member of claim 1, wherein said acrylic resin is a copolymer of (1) an acrylic acid ester and (2) one or more comonomers selected from the group consisting of acrylic acid, methacrylic acid and itaconic acid.

3. The magnetic recording member of claim 1, wherein said polyisocyanate compound is an aliphatic diisocyanate, an aromatic diisocyanate or an adduct of a diisocyanate with a polyol.

4. The magnetic recording member of claim 1, wherein said polyisocyanate compound is toluene diisocyanate, diphenylmethane diisocyanate, methylene-p-phenyl diisocyanate, 4,4'-diphenyl diisocyanate, hexamethylene diisocyanate, p-phenylene diisocyanate, 4-methyl-m-phenylene diisocyanate, or an adduct of hexamethylene diisocyanate with trimethylol propane.

5. The magnetic recording member of claim 1, wherein said binder is present at a level ranging from 70 to 150 parts by weight for each 300 parts by weight of said magnetic powder.

* * * * *